United States Patent
Steigler (10) Patent No.: US 9,816,836 B2
(45) Date of Patent: Nov. 14, 2017

(54) CORRELATING METER DATA TO DETECT MISMAPPINGS

(71) Applicant: ORACLE INTERNATIONAL CORPORATION, Redwood Shores, CA (US)

(72) Inventor: Patrick Steigler, Oakland, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 194 days.

(21) Appl. No.: 14/536,808

(22) Filed: Nov. 10, 2014

(65) Prior Publication Data

US 2016/0131501 A1    May 12, 2016

(51) Int. Cl.
*G01D 4/00* (2006.01)
*G06F 17/30* (2006.01)

(52) U.S. Cl.
CPC ....... *G01D 4/002* (2013.01); *G06F 17/30371* (2013.01); *G06F 17/30876* (2013.01); *Y02B 90/241* (2013.01); *Y04S 20/32* (2013.01); *Y04S 20/36* (2013.01); *Y04S 20/48* (2013.01)

(58) Field of Classification Search
CPC .............. G01D 4/002; G06F 17/30371; G06F 17/30876; H04Q 9/00; H04Q 2209/60
See application file for complete search history.

(56) References Cited

U.S. PATENT DOCUMENTS

| | | | |
|---|---|---|---|
| 7,769,888 B2 * | 8/2010 | Flammer | H04L 45/00 340/870.01 |
| 9,285,242 B2 * | 3/2016 | Arya | G01D 4/00 |
| 9,292,794 B2 * | 3/2016 | Arya | G06N 5/04 |
| 2007/0005275 A1 * | 1/2007 | Bickel | G01D 4/002 702/60 |
| 2008/0065712 A1 * | 3/2008 | Bickel | G01D 4/002 708/422 |
| 2010/0231413 A1 * | 9/2010 | Conant | G06Q 10/10 340/870.02 |
| 2010/0306151 A1 * | 12/2010 | Bickel | G01D 4/002 706/46 |
| 2014/0039818 A1 * | 2/2014 | Arya | G01D 4/00 702/62 |
| 2015/0052088 A1 * | 2/2015 | Arya | G06N 5/04 706/12 |

* cited by examiner

*Primary Examiner* — Patrick Edouard
*Assistant Examiner* — Eboni Hughes
(74) *Attorney, Agent, or Firm* — Cooper Legal Group, LLC (57) ABSTRACT

Systems, methods, and other embodiments associated with identifying mismappings of electric meters using voltage data are described. In one embodiment, a method includes selecting an electric meter from a plurality of electric meters represented in a connectivity model. The connectivity model is an electronic data structure that specifies information about connections between the plurality of electric meters and transformers in an electric distribution grid. The example method may also include analyzing mismapping metrics that characterize voltage data about the selected electric meter in relation to a set of electric meters that are geographically related to the selected electric meter to determine whether the connectivity model includes a mismapping of the selected electric meter.

17 Claims, 4 Drawing Sheets

CORRELATING METER DATA TO DETECT MISMAPPINGS

BACKGROUND

Electric distribution grids are complex systems of many different components that work together to distribute electricity. In general, an electric distribution grid may include a generation point, various transmission components, transformers, and electric meters at each point of use. Accordingly, tracking physical components and connections between the physical components within the electric distribution grid can be difficult. An electric utility company may maintain electronic records of the components and connections between the components, however, the records are generally prone to errors.

For example, connections between components are often entered manually into the records and are subject to error from incorrect entries. The errors may become more numerous when, for example, field service workers from a different utility company help restore connections after a storm or other significant event. Accordingly, workers without knowledge of proper entry protocols and without knowledge of local geography are more likely to introduce errors into the records.

Furthermore, checking for mismappings within the records is accomplished by manually comparing the records against an onsite survey. This process is tedious and time consuming while also being prone to manual entry errors. Accordingly, difficulties exist with ensuring accuracy of the records against real-world circumstances.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein that provide for identifying electric meter mismappings using voltage data of geographically related electric meters. In one embodiment, a system uses hourly voltage data from electric meters (e.g., smart meters) to detect incorrect meter-to-transformer mappings as represented in a connectivity model. For example, a mismapping includes a situation where two electric components are shown to be connected to each other in the data of the connectivity model but in actuality, the two physical components are not electrically connected to each other (or vice versa).

Consider that electric meters connected to a same transformer are connected in a parallel circuit. Thus, voltage data reported from the electric meters connected to the same transformer should correlate. That is, the voltage data of electric meters of the same transformer should be similar since these electric meters receive the same voltage from the transformer and are connected in parallel in an electric circuit. By contrast, voltage data for electric meters that are connected to different transformers will generally not correlate because these electric meters are not connected in a parallel electric circuit, but instead receive electricity from different transformers with varying characteristics.

Thus, in one embodiment, mismappings in the connectivity model are identified by using a correlation function to characterize and compare voltage data. For example, voltage data of a selected meter may be compared with voltage data of electric meters that are identified as being connected to the same transformer and compared with voltage data of geographically near electric meters of different transformers. By correlating and comparing the voltage data, a mismapping can be detected and correct mappings can be suggested through identified correlations in the voltage data.

Figure 1:
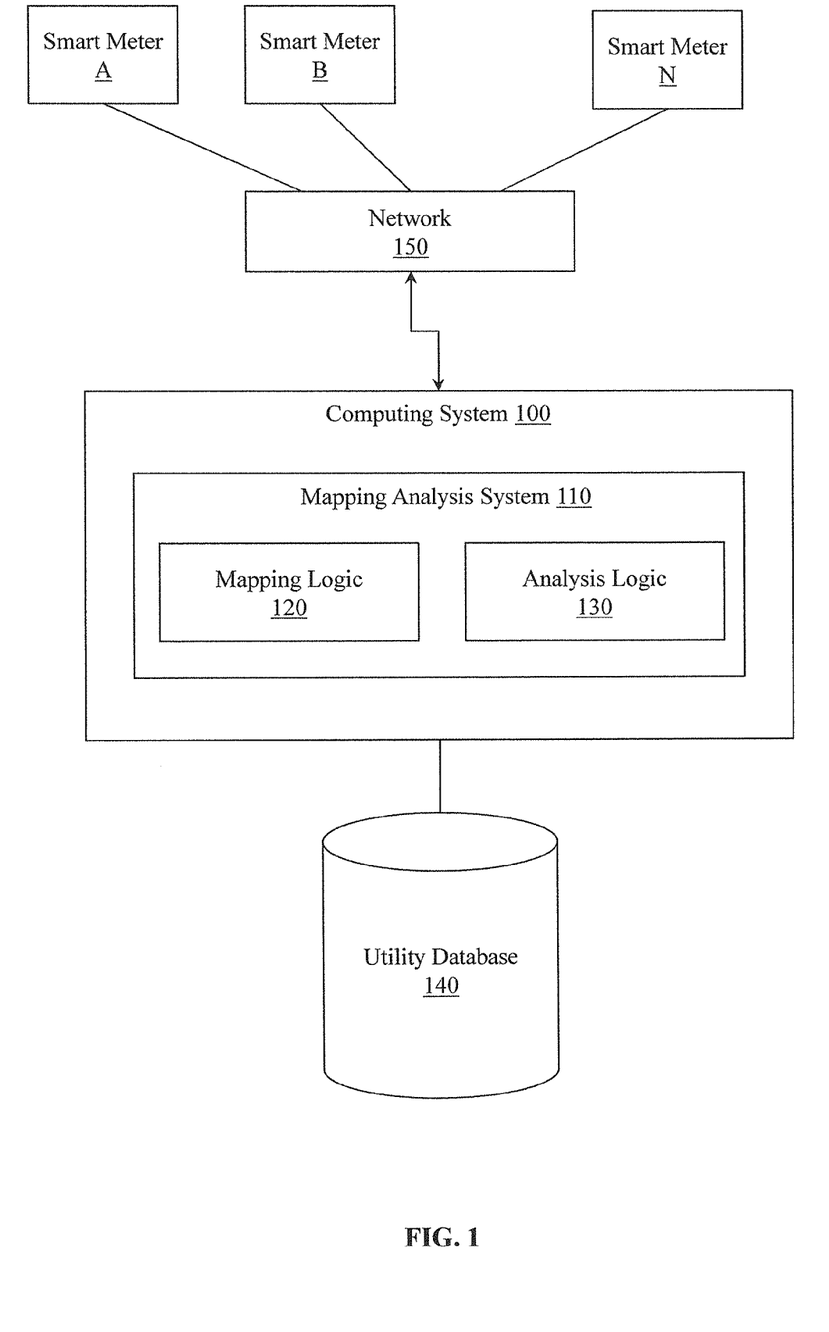
FIG. 1 illustrates one embodiment of a system associated with identifying electric meter mismappings in a connectivity model.

With reference to FIG. 1, one embodiment of a computing system 100 associated with identifying mismappings of electric meters is illustrated. The computing system 100 includes a mapping analysis system 110 configured as an executable application that includes at least mapping logic 120 and analysis logic 130. In one embodiment, the mapping logic 120 is configured to generate mismapping metrics from voltage data stored in a utility database 140. The analysis logic 130 is, for example, configured to use the mismapping metrics to determine whether a connectivity model correctly maps a location/connection of an electric meter.

In general, the computing system 100 is a computer system that includes at least a processor, memory, and network interface, and includes the mapping analysis system 110 that is configured to communicate with a number of smart meters A-N over a communication network 150. The smart meters, for example, are configured in various remote locations and operate in an electric grid. In one embodiment, the computing system 100 collects meter data (e.g., voltage data) from the smart meters and stores the data in the utility database 140 in data structures such as data records, data tables, files, etc. for each smart meter.

Additionally, the mapping analysis system 110 manages a connectivity model stored in an electronic data structure, such as a graph, tree, or a similar data structure in the utility database 140. The connectivity model includes information about connections between elements in an electric distribution grid. For example, the connectivity model includes information about connections for each electric meter, connections between transformers and meters, and/or between other electric components, and so on. That is, the connectivity model specifies at least which transformer is connected to each electric meter. In one embodiment, the connectivity model also includes information/properties about different components in the electric grid and may describe other properties of the electric grid. The mapping analysis system 110 is configured to read the data structure of the connectivity model and determine how components are connected and/or which components are connected together according to the model. While the meter data and connectivity model are discussed as being stored together in the utility database 140, of course, they may be stored in separate databases depending on a specific implementation.

In general, an electric distribution grid is a physical network of a utility company. Accordingly, the electric distribution grid includes many different electrical components. The different components, for example, connect a power generation station to substations, to transformers, and down to meters at each location of service (e.g., residential location) to provide electricity. Generally speaking, a transformer in the electric grid provides electricity to multiple meters.

The meters are, for example, smart meters that are connected to power lines linking the meters to transformers. The smart meters are configured to monitor and log data about conditions of the smart meters (e.g., voltages) and electric usage. In one embodiment, the meters can provide collected information about voltages and electric usage on-demand via network messages to the computing system 100. Accordingly, the meters may provide continuous data, data at some predefined interval, or data when requested. In either case, the information may be provided from the meters at a rate which is most relevant to a particular implementation.

In one embodiment, the voltage data for each meter is provided at an interval of an hour. In this way, enough data is available to provide an accurate portrait of voltages while not over-burdening data storage. However, in another embodiment, the voltage data may be provided at other designated intervals, for example, an interval of a minute, half hour, day and so on.

With respect to the data itself, the voltage data is data for each meter that indicates a current voltage present at the meter. In one embodiment, the voltage data may be an average voltage for an interval of time (e.g., one hour). Accordingly, the voltage data may be expressed as a mean for the interval of time (e.g., root mean square (RMS)) or whichever form is most applicable to a given interval. Of course, the data may be organized and formatted in other desired formats using different types of data structures and may include a variety data attributes/properties that are collected and stored.

Turning to analyzing the voltage data, in one embodiment, the mapping logic 120 is configured to initially select an electric meter from the connectivity model that will be analyzed. In general, one meter is analyzed at a time. However, it should be appreciated that meters may be analyzed in batches, sets or other groupings depending on a given preference. Additionally, the mapping logic 120 may automatically select an electric meter from the connectivity model according to a predefined function, a user input, or other manner. In either case, once an electric meter is selected, the mapping logic 120 identifies additional electric meters geographically associated with the selected meter based on at least the connection/location data in the model.

Figure 2:
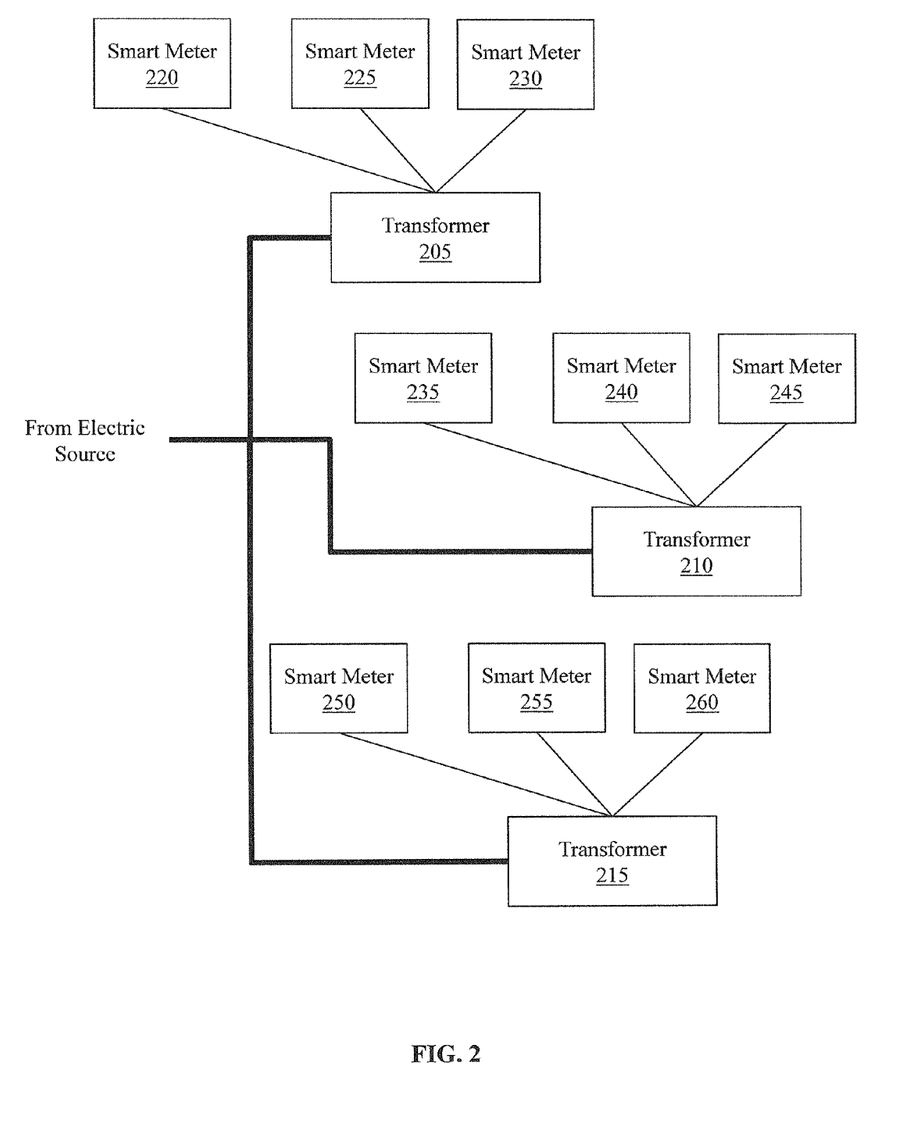
FIG. 2 illustrates a representation of connections between different components of an electric grid.

To understand why the mapping logic 120 identifies the geographically related meters for analysis, briefly consider FIG. 2, which illustrates a representation of connections between different components of an electric grid. In FIG. 2, three separate transformers 205, 210, and 215 are illustrated. In general, on an upstream side, the transformers 205, 210, and 215 are connected to power lines that link the transformers 205, 210, and 215 to a source of electricity (e.g., generating stations via one or more substations). On a downstream side, the transformers 205, 210, and 215 are connected via parallel circuits to electric smart meters. Of course, the transformers 205, 210 and 215 illustrate a limited portion of the electric grid, which generally includes a multiplicity of transformers distributed throughout a wide geographic area.

In FIG. 2, transformer 205 is connected to smart meters 220, 225 and 230 via a parallel electric circuit. Similarly, transformer 210 and transformer 215 are connected via separate parallel circuits to smart meters 235, 240, 245, 250, 255, and 260, respectively. In general, the transformers 205, 210, and 215 may be located within a geographically close configuration. That is, the transformers 205, 210, and 215 may be located on separate blocks in a city, on separate streets, on a same street, and so on. Thus, errors may arise within the connectivity model when, for example, meters are connected/re-connected to a different transformer than specified within the connectivity model, entries are improperly entered into the connectivity model for a connection, and so on. Accordingly, many circumstances exist where a connection for a meter is incorrectly defined within the connectivity model with a nearby transformer.

Consequently, the mapping logic 120 is configured to analyze geographically related meters of nearby transformers along with meters of a same transformer to identify mismappings. For example, if the mapping logic 120 selects the electric meter 240, then a first subset of geographically related meters would include meters 235 and 245 from the same transformer 210. Additionally, the mapping logic 120 may also identify other meters of nearby transformers, such as, the meters from transformers 205 and 215 for a second subset of electric meters.

The first subset of electric meters (i.e., meters on transformer "mots") represents meters that should have a similar voltage characteristic to the selected meter. As identified in the connectivity model, the first subset of electric meters is connected to the same transformer 210 via a parallel electrical circuit. Thus, a voltage realized at each meter of the first subset should be substantially similar because the transformer 210 provides the voltage to the parallel circuit that connects to the first subset of meters.

The second subset of electric meters (i.e., geographically near meters "gnms") represents meters connected to different transformers than a selected meter. Thus, meters of the second subset should not have a similar voltage characteristic as the selected meter because they are connected to different transformers with different voltage characteristics. However, meters from the second subset may have similar characteristics if the selected meter is mismapped to, for example, one of the transformers 205 or 215.

Accordingly, a set of electric meters that are identified along with the selected meter includes the first subset and the second subset of electric meters. In this way, geographically nearby meters are used to characterize voltages of different transformers and to identify correct connection points for a selected meter.

Returning to the mapping logic 120 of FIG. 1, once the set of meters are identified for the selected meter, the mapping logic 120 retrieves voltage data for the set of meters and the selected meter from the utility database 130. As described, the voltage data includes voltage information for each meter in the set of meters and the selected meter over a predefined period of time (e.g., seven days). While seven days is discussed in this example, of course, other predefined periods of time may be used.

Subsequently, the mapping logic 120 generates mismapping metrics for the set of electric meters. In one embodiment, the mapping logic 120 uses a correlation function to characterize the voltage data by generating the mismapping metrics. The correlation function and specifics of how the mismapping metrics are generated will be discussed in further detail along with FIG. 3. However, in general, the mapping logic 120 generates the mismapping metrics to characterize the voltage data of the selected electric meter against the voltage data for the set of electric meters. That is, the mismapping metrics illustrate a degree of mismapping between voltages of the selected meter and the set of meters by showing correlations between the voltage data.

From the mismapping metrics, the analysis logic 130 determines whether the connectivity model accurately maps the selected meter to an indicated transformer. For example, if the mismapping metrics indicate a low correlation between the selected meter and meters of the same transformer (i.e., the first subset), then the selected meter is likely mismapped. This suggests that the connection data in the model incorrectly connects the selected meter to the transformer when the actual physical meter is probably not physically connected to the transformer with an electric connection.

Accordingly, in this instance, the mismapping metrics may indicate a better correlation with meters from a different transformer represented in the second subset. That is, voltage characteristics of the selected meter are similar to voltage characteristics from meters of another transformer than a connected transformer indicated in the connectivity model, which indicates a likely mismapping.

In one embodiment, the analysis logic 130 is configured to identify a mismapping by comparing a minimum mismapping metric from metrics of the first subset with a minimum mismapping metric from metrics of the second subset. A minimum mismapping metric for a subset of meters is a mismapping metric that is, for example, closest to zero or a metric that most closely correlates with the selected meter for the subset.

In one embodiment, the analysis logic 130 indicates a mismapping if, for example, the mismapping metric from the second subset is smaller than the mismapping metric from the first subset by a predefined amount (e.g., by 0.1). In one embodiment, the predefined amount is an amount sufficient to distinguish the metrics beyond a statistical error or according to a specific preference of assurance beyond the statistical error.

Furthermore, in one embodiment, the analysis logic 130 also suggests a correct mapping according to the mismapping metrics. That is, the analysis logic 130 will indicate a correct mapping for the selected meter in the connectivity model. The correct mapping is, for example, a connection to whichever transformer is associated with a meter that provides the minimum mismapping metric from the second subset. In this way, incorrect mappings may be identified while automatically correcting or suggesting corrections to inaccuracies in the connectivity model. In one embodiment, this may include transforming the connectivity model to include revised connections such as new connections between components and/or deleted connections between components.

Figure 3:
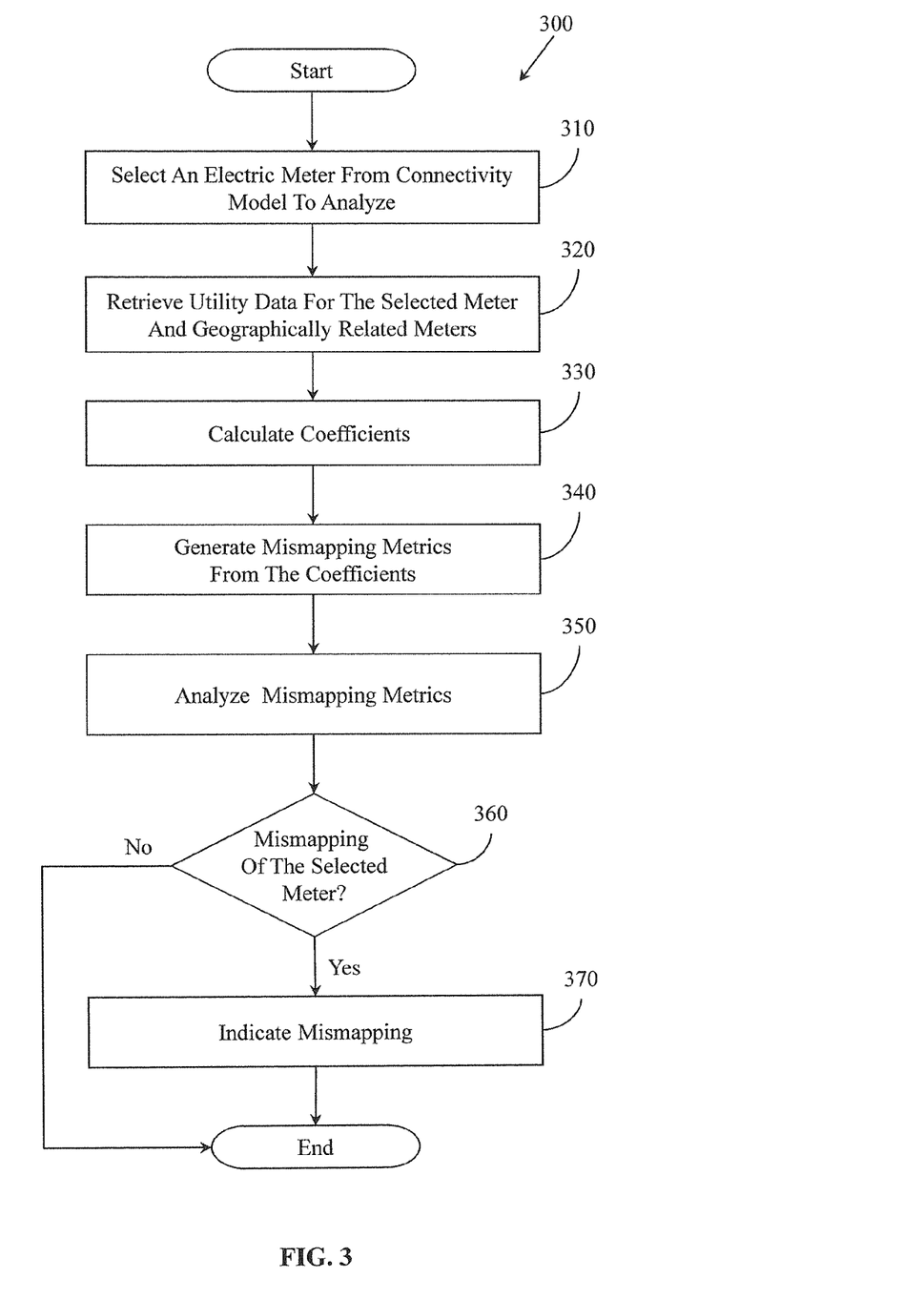
FIG. 3 illustrates one embodiment of a method associated with analyzing voltage data to identify mismapping of electric meters in a connectivity model.

Identifying mismappings using voltage data from smart meters will be discussed in further detail with reference to FIG. 3. FIG. 3 illustrates one embodiment of a method 300 associated with analyzing utility data to identify mismappings in a connectivity model.

At 310, an electric meter is selected from among a plurality of electric meters represented in a connectivity model. In one embodiment, selecting an electric meter includes picking one of the plurality of electric meters to analyze. Thus the selected meter is targeted for analysis (e.g., target meter). In general, picking the electric meter may occur in a number of different ways. For example, the electric meter may be selected as part of a batch operation, because of a flag indicating a possible mismapping, as a result of a recent change within the connectivity model, based on a user input or according to some other function.

Additionally, selecting the electric meter also includes identifying a set of meters that are geographically relevant to the selected electric meter. For example, other meters in a geographically near area are identified from the connectivity model in order to compare the selected meter with nearby meters. In general, the geographically near meters are identified according to two separate groups. A first group includes meters connected to the same transformer as the selected meter as determined from the connectivity model. A second group includes meters connected to transformers that are nearby the selected meter. In this way, locations of alternative connections for the selected meter are analyzed while also, for example, comparing many different meters under similar environmental conditions.

At 320, voltage data is retrieved from an electronic database for the set of meters and the selected meter. As previously discussed, the voltage data is, for example, hourly voltage data over a period of time (e.g., seven days) for each individual meter. Accordingly, the voltage data provides an insight into voltages at each different transformer that can be used to correlate the selected meter with meters of a multiple transformers to identify a correct mapping.

At 330, correlation coefficients are calculated for the meters. In one embodiment, the correlation coefficients are calculated between each of the meters in the set of meters and the selected electric meter. In general, the correlation coefficients indicate how closely voltage data for the selected meter correlates with voltage data for each individual meter in the set of meters. Thus, individual correlation coefficients for each meter indicate how closely voltage data of a given meter correlates with the selected meter.

In one embodiment, the correlation coefficients are calculated according to a correlation function. For example, the correlation function may include calculating two separate coefficients for each meter that include 1) a linear regression slope coefficient and 2) a Pearson r correlation coefficient. Additionally, in one embodiment, the coefficients are normalized after being calculated. For example, the coefficients may be normalized to provide values that are positive and between zero and one, where a value of one indicates a high correlation and a value of zero indicates a low correlation.

At 340, the mismapping metrics are generated using the coefficients from 330. In one embodiment, a mismapping metric is generated for each meter in the set of meters. For example, the mismapping metric is generated by subtracting the coefficients determined at 330. In one embodiment, the normalized Pearson r correlation coefficient is subtracted from the normalized linear regression slope coefficient for each of the meters. In another embodiment, each coefficient for a meter is first subtracted from a value of one and then a result is summed to provide the mismapping metric. Resulting mismapping metrics characterize how similar voltages are between each given meter and the selected meter. That is, the mismapping metrics summarize, in a single value, similarities indicated individually by both of the coefficients.

At 350, the mismapping metrics are analyzed further. In one embodiment, at 350, a minimum mismapping metric is determined for the first group of meters and for the second group of meters. The minimum mismapping metric is a mismapping metric that, for example, most closely correlates with the selected meter for each group. In one embodiment, a mismapping metric that closely correlates will have a value that approaches zero.

Because the correlation coefficients tend toward a value of one when closely correlating with the selected meter, subtracting the two coefficients for a closely correlating example would provide a result with a value close to zero. Thus, a mismapping metric of zero indicates a high level of correlation between the selected meter and a meter for which the mismapping metric was calculated.

At 360, the two minimum mismapping metrics from 350 are compared to determine whether the selected meter is mismapped in the connectivity model. In one embodiment, comparing the mismapping metrics, at 360, includes determining whether the minimum mismapping metric of the second group satisfies a condition for indicating a mismapping. In one embodiment, the condition is a predefined difference between the two minimum mismapping metrics. For example, the predefined difference may be the mismapping metric from the second group being less than the mismapping metric from the first group by a predetermined amount. (e.g., 0<second minimum<first minimum).

If the noted condition is satisfied, then a mismapping is indicated at 370. If not, then method 300 ends with no mismapping being indicated.

In general, the mismapping metrics indicate how closely voltage data of a given meter correlates with the selected meter. It is expected that when the voltage data of two meters closely correlates they are connected to a same transformer. Thus, when voltage data of a meter that is not mapped to the same transformer most closely correlates, a likely result is that the connectivity model includes a mismapping of the selected meter. Accordingly, identifying these anomalies in the voltage data permits identification of likely mismappings using the voltage data from smart meters.

At 370, the mismapping is indicated. In one embodiment, indicating the mismapping includes issuing an alert in the form of an electronic communication, automatically modifying the connectivity model to note the mismapping, automatically correcting the connectivity model to an anticipated correct mapping and so on. In this way, inaccuracies in the connectivity model can be identified and noted for further investigation or simply immediately corrected.

Computer Embodiment

Figure 4:
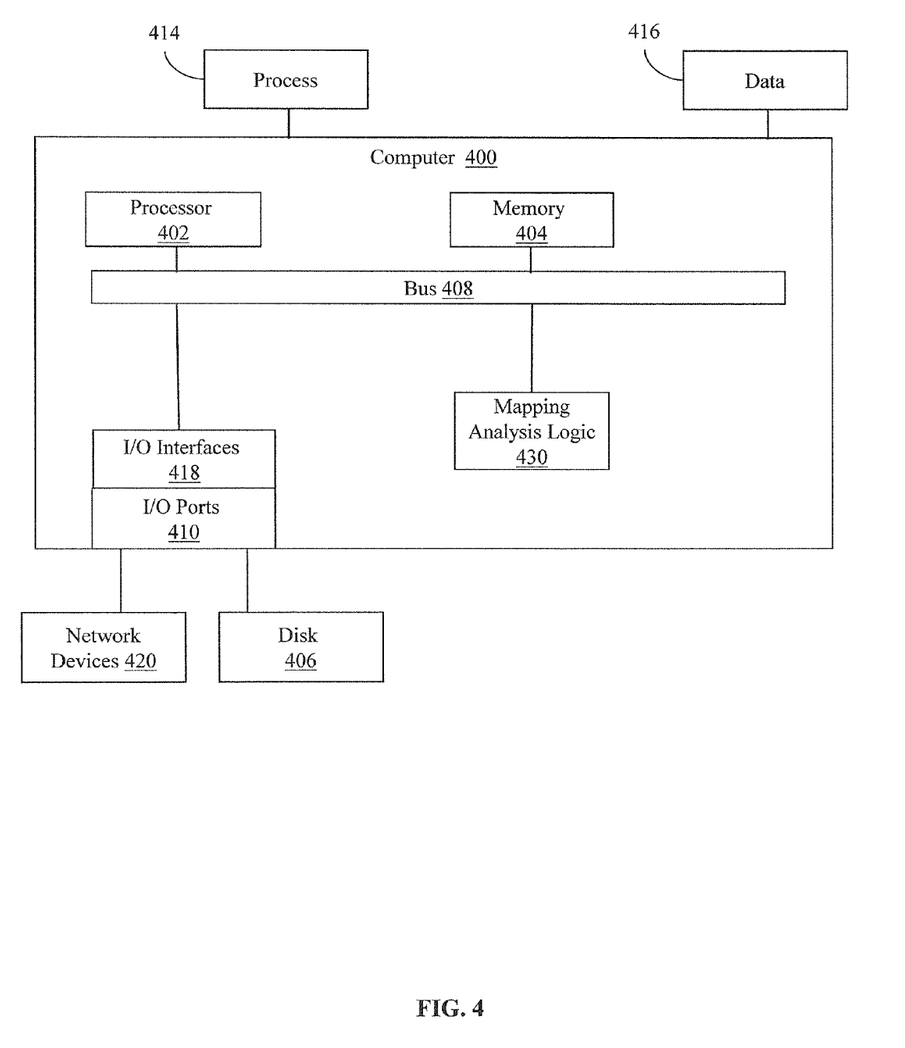
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include mapping analysis logic 430 configured to facilitate analyzing voltage data from smart meters to identify mismappings in a connectivity model of an electric grid similar to mapping analysis system 110 shown in FIG. 1. In different examples, the logic 430 may be implemented in hardware, a non-transitory computer-readable medium with stored instructions, firmware, and/or combinations thereof. While the logic 430 is illustrated as a hardware component attached to the bus 408, it is to be appreciated that in one example, the logic 430 could be implemented in the processor 402.

In one embodiment, logic 430 or the computer is a means (e.g., hardware, non-transitory computer-readable medium, firmware) for generating mismapping metrics from smart meter voltage data and analyzing the mismapping metrics to identify mismappings in a connectivity model of an electric grid.

The means may be implemented, for example, as an ASIC programmed to generate correlation coefficients and analyze the coefficients to identify the mismappings. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for automatically correcting mismappings in the connectivity model according to analysis of the mismapping metrics.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described.

Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can function with. Each type of media, if selected for implementation in one embodiment, includes stored instructions of an algorithm configured to perform one or more of the disclosed and/or claimed functions.

"Logic", as used herein, includes a component that is implemented in computer or electrical hardware, firmware, a non-transitory medium with stored instructions of an executable algorithm/application, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing instructions executable by at least a processor of a computing device, which when the instructions are executed cause at least the processor to:
   read, by at least the processor, a connectivity model, wherein the connectivity model specifies at least meterto-transformer mappings that identify connections between at least electric meters and transformers in an electric grid;

identify from the connectivity model, by at least the processor, a set of electric meters that are connected to a first transformer, and select an electric meter from the set of electric meters;

retrieve, from an electronic database, voltage data about the set of electric meters that are connected to the first transformer;

compare the voltage data for the selected electric meter with the voltage data for other electric meters from the set of electric meters according to a correlation function to determine whether the selected electric meter is correctly connected to the first transformer in the connectivity model or is an incorrect meter-to-transformer mapping; and in response to determining that the selected electric meter has the incorrect meter-to-transformer mapping:

select, by at least the processor, a second set of electric meters that are within a geographically near location to the selected electric meter as represented in the connectivity model, wherein the second set of electric meters are connected to a second transformer in the connectivity model; and compare, by at least the processor, the voltage data for the selected electric meter with voltage data for the second set of electric meters according to the correlation function, and if the selected electric meter has similar voltage characteristics with the second set of electric meters, then indicate a corrected mapping that the selected electric meter should be mapped to the second transformer in the meter-to-transformer mappings.

2. The non-transitory computer-readable medium of claim 1, wherein the instructions for comparing includes instructions that when executed by at least the processor cause at least the processor to generate mismapping metrics from the voltage data using the correlation function to characterize the voltage data of the selected electric meter against the voltage data for the set of electric meters to determine whether characteristics of the voltage data for the selected electric meter correlate with the meter-to-transformer mappings in the connectivity model.

3. The non-transitory computer-readable medium of claim 1, wherein the instructions for comparing the voltage data includes instructions that when executed by at least the processor cause at least the processor to generate mismapping metrics by calculating correlation coefficients and linear regression slope coefficients between the voltage data of the first set of electric meters and the selected electric meter, and between the voltage data of the second set of electric meters and the selected electric meter.

4. The non-transitory computer-readable medium of claim 1, wherein the instructions for determining whether the connectivity model includes a mismapping of the incorrect meter-to-transformer mapping includes instructions that when executed by at least the processor cause at least the processor to compare a first mismapping metric from the first set of electric meters with a second mismapping metric from the second set of electric meters to determine whether the first mismapping metric is within a predefined threshold of the second mismapping metric, and wherein the first mismapping metric is a minimum mismapping metric from the first set of electric meters and the second mismapping metric is a minimum mismapping metric from the second set of electric meters.

5. The non-transitory computer-readable medium of claim 1, wherein the instructions for comparing the voltage data includes instructions that when executed by at least the processor cause at least the processor to generate mismapping metrics for each electric meter of the set of electric meters, wherein the mismapping metrics indicate a similarity between voltage characteristics of the selected electric meter and the set of electric meters, wherein generating the mismapping metrics include calculating a Pearson r correlation coefficient and a Linear regression coefficient between the voltage data for each electric meter of the set of electric meters and the selected electric meter.

6. The non-transitory computer-readable medium of claim 1, further comprising instructions that when executed by at least the processor cause at least the processor to:

select the selected electric meter from a plurality of electric meters represented in the connectivity model, wherein the voltage data is smart meter data collected from each of the set of electric meters over a communication network, and wherein the voltage data includes hourly voltage data over a period for each of the set of electric meters.

7. The non-transitory computer-readable medium of claim 1, wherein the instructions for comparing the voltage data to determine whether the connectivity model includes a mismapping of the meter-to-transformer mappings includes instructions that when executed by at least the processor cause at least the processor to specify in the connectivity model that a mapping of the selected electric meter is incorrect when the voltage data does not correlate for the set of electric meters on a same transformer as the selected electric meter.

8. A computing system, comprising:

at least one processor connected to at least one memory;

mapping logic stored in a non-transitory computer-readable medium and including instructions executable by the at least one processor to cause the at least one processor to retrieve, from an electronic database, voltage data about a selected electric meter and voltage data about a set of electric meters that are geographically associated with the selected electric meter according to a connectivity model, wherein the selected electric meter and the set of electric meters are represented in the connectivity model that specifies at least information about connections between electric meters and transformers of an electric grid;

wherein the mapping logic is configured to generate mismapping metrics for the set of electric meters using the voltage data as input to a correlation function;

wherein the mapping logic is further configured to generate the mismapping metrics by using the correlation function to characterize the voltage data of the selected electric meter against the voltage data for the set of electric meters to determine whether characteristics of the voltage data for the selected meter correlate with a current mapping in the connectivity model; and analysis logic stored in the non-transitory computer-readable medium and including instructions executable by the at least one processor to cause the at least one processor to analyze the mismapping metrics to determine whether the connectivity model includes a mismapping of the selected electric meter;

wherein the voltage data is smart meter data collected from each of the set of electric meters over a communication network, wherein the voltage data includes hourly voltage data over a period for each of the set of electric meters, wherein the analysis logic is configured to specify in the connectivity model that a mapping of the selected meter is incorrect when the mismapping metrics for electric meters on a same transformer as the selected transformer do not correlate.

9. The computing system of claim 8, wherein the set of electric meters include a first subset of electric meters and a second subset of electric meters, wherein the first subset of electric meters are connected to a same transformer as the selected electric meter in the connectivity model and the second subset of electric meters are within a geographically near location to the selected meter in the connectivity model.

10. The computing system of claim 9,
wherein the mapping logic is configured to generate the mismapping metrics by calculating correlation coefficients and linear regression slope coefficients between voltage data of the first subset of electric meters and the selected electric meter, and between voltage data of the second subset of electric meters and the selected meter,
wherein the mapping logic is configured to generate the mismapping metrics by normalizing and combining the correlation coefficients and the linear regression slope coefficients for each electric meter in the set of electric meters to produce a mismapping metric for each of the set of electric meters, and
wherein the mismapping metrics indicate a similarity between voltage characteristics of the selected electric meter and the first subset of electric meters and the second subset of electric meters.

11. The computing system of claim 9,
wherein the analysis logic is configured to analyze include instructions for comparing a first mismapping metric from the first subset of electric meters with a second mismapping metric from the second subset of electric meters to determine whether the first mismapping metric is within a predefined threshold of the second mismapping metric, and wherein the first mismapping metric is a minimum mismapping metric from the first subset of electric meters and the second mismapping metric is a minimum mismapping metric from the second subset of electric meters.

12. The computing system of claim 8, wherein the hourly voltage is root mean square voltage data.

13. A computer-implemented method comprising:
selecting, by at least a processor of a computing device, an electric meter from a plurality of electric meters represented in a connectivity model, wherein the connectivity model is an electronic data structure that specifies information about connections between the plurality of electric meters and transformers in an electric distribution grid; and analyzing, by at least the processor, mismapping metrics that characterize voltage data about the selected electric meter in relation to a set of electric meters that are geographically related to the selected electric meter to determine whether the connectivity model includes a mismapping of the selected electric meter;

wherein the set of electric meters include a first subset of electric meters and a second subset of electric meters, wherein the first subset of electric meters are connected to a same transformer as the selected electric meter in the connectivity model and the second subset of electric meters are within a geographically near location to the selected meter in the connectivity model and are connected to one or more different transformers than the selected electric meter.

14. The method of claim 13, wherein analyzing includes comparing a first mismapping metric from the first subset of electric meters with a second mismapping metric from the second subset of electric meters to determine whether the first mismapping metric is within a predefined threshold of the second mismapping metric, and wherein the first mismapping metric is a minimum mismapping metric from the first subset of electric meters and the second mismapping metric is a minimum mismapping metric from the second subset of electric meters.

15. The method of claim 13, wherein analyzing the mismapping metrics includes specifying in the connectivity model that a mapping of the selected meter is incorrect when the mismapping metrics do not correlate for electric meters on a same transformer as the selected transformer.

16. The method of claim 13, further comprising:
retrieving, from an electronic database, the voltage data about the selected electric meter and voltage data about the set of electric meters associated with the selected electric meter, wherein the set of meters are related to the selected meter based, at least in part, on a geographic location, and
wherein selecting the electric meter from the plurality of electric meters includes automatically selecting the electric meter according to a predefined function.

17. The method of claim 13, further comprising:
generating the mismapping metrics for the set of electric meters according to a correlation function and the voltage data about the set of electric meters and the selected electric meter, wherein the voltage data is smart meter data collected from each electric meter in the set of electric meters over a period of time, and wherein the mismapping metrics quantize a relationship between the voltage data of the selected meter and the voltage data of the set of electric meters.

* * * * *